D. W. EVANS.
VEHICLE BRAKE.
APPLICATION FILED NOV. 13, 1909.
999,554.
Patented Aug. 1, 1911.
2 SHEETS—SHEET 1.
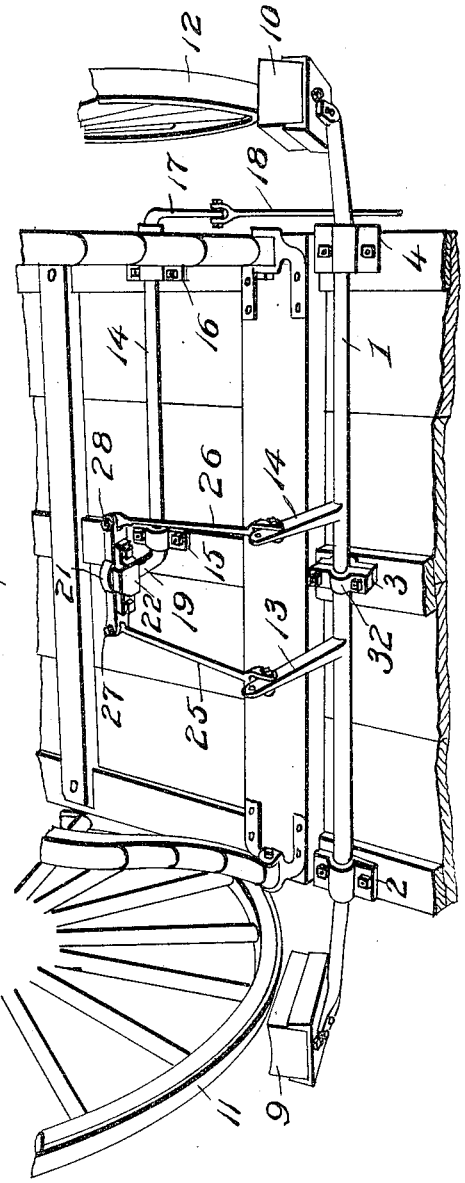
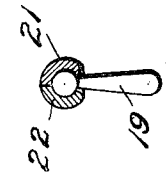
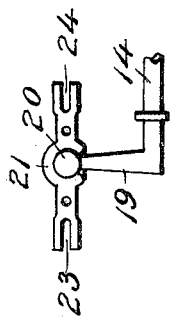
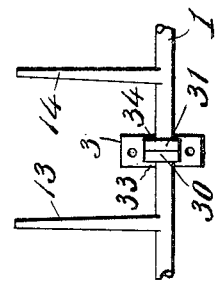

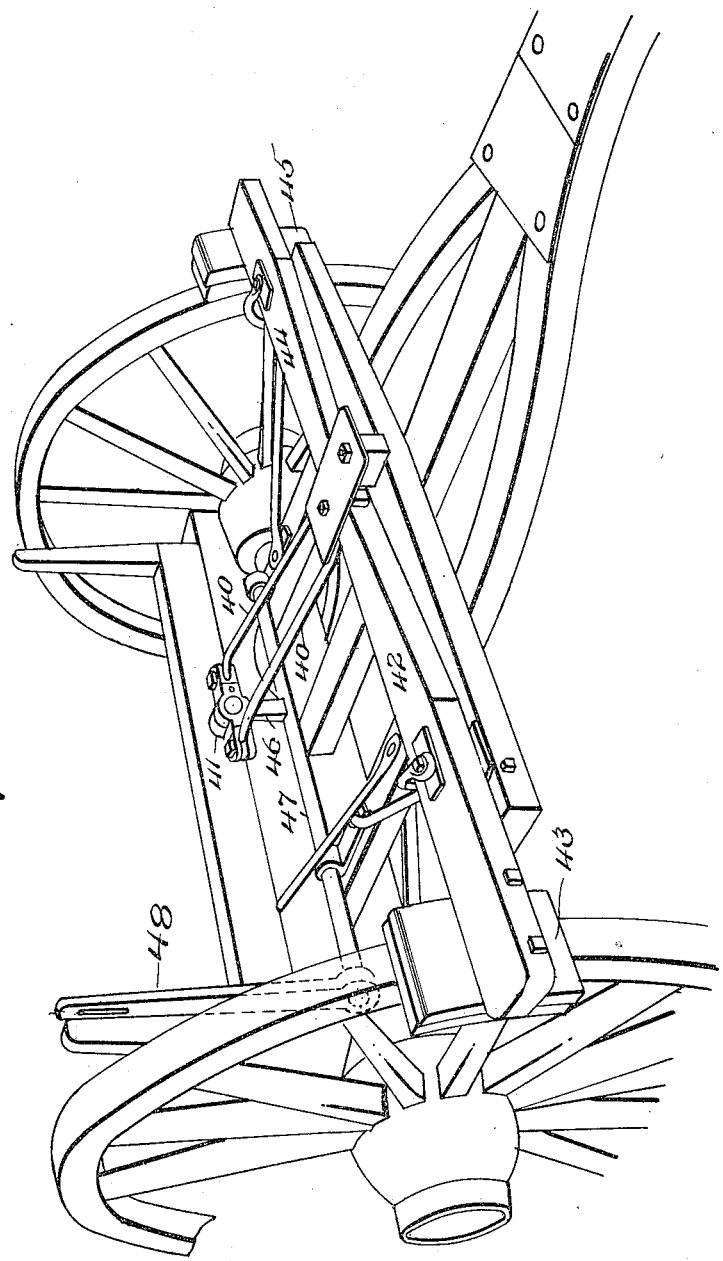

UNITED STATES PATENT OFFICE.

DAVID W. EVANS, OF PITTSTON, PENNSYLVANIA.

VEHICLE-BRAKE.

999,554.

Specification of Letters Patent.   Patented Aug. 1, 1911.

Application filed November 13, 1909.   Serial No. 527,939.

*To all whom it may concern:*

Be it known that I, DAVID W. EVANS, a citizen of the United States, residing at Pittston, in the county of Luzerne and State of Pennsylvania, have invented certain new and useful Improvements in Vehicle-Brakes; and I do hereby declare the following to be a full, clear, and exact description of the invention, such as will enable others skilled in the art to which it appertains to make and use the same.

This invention relates to brakes, and the object is to provide a device which will insure uniform pressure on both of the brake shoes, and which will give more leverage than the apparatus in ordinary use affords.

With these objects in view the invention consists in the novel construction hereinafter more fully described and claimed.

In the accompanying drawings:—Figure 1 is a view in perspective showing the improved apparatus attached to the brake shaft of a vehicle. Fig. 2 is a detail view showing a portion of the brake shaft with operating levers projecting therefrom. Fig. 3 is also a detail view showing one end of the rock shaft for operating the brake shaft. Fig. 4 is a detail showing one end of the rock shaft in elevation and showing in section a portion of the cross bar connected by a ball and socket joint with the end of the rock shaft. Fig. 5 is a detail view of one of the brackets used to connect the shafts with the body portion of the vehicle. Fig. 6 is a perspective view of a modification.

In carrying out my invention I provide a brake beam, or more properly speaking, a brake shaft which I have designated in the drawings by the numeral 1. This shaft is formed in sections and is attached to the under side of the body of the vehicle by brackets 2, 3, and 4, brackets 2 and 4 being formed in the manner illustrated in Fig. 5. It will be seen from an examination of the latter figure that the bearing portion of the bracket is so formed that it incloses somewhat more than one-half of that portion of the shaft which passes through the bracket, and in this manner a complete bearing is formed without the necessity of using a separate member or of relying upon the surface of one of the portions of the frame of the vehicle as a part of the bearing surface. In Fig. 5 the curved portion of the bracket is designated by 6, and that portion projecting from one of the flat members 7 of the bracket and designed to extend partly around the shaft is designated by 8.

The brake shaft 1 has fixed to the ends thereof brake shoes 9 and 10 designed to be thrown against wheels 11 and 12 by the operation of levers 13 and 14' connected to said shaft 1 at points on either side of the center of shaft 1. A supplemental shaft indicated by 14 is connected to the framework of the wagon by means of brackets 15 and 16, these brackets being constructed as already described. Shaft 14 is in fact a rock shaft and has connected to its outer end and preferably formed integrally therewith an arm 17 pivoted to the operating rod 18 which may be connected to the usual brake lever not shown. The opposite end of rock shaft 14 carries an arm 19 projecting at right angles to the shaft and in the opposite direction to arm 17, such arm 19 carrying on its upper end an enlarged portion 20 which is spherical in form and constitutes the ball of the ball and socket joint, the bearing thereof being formed partly in cross head 21 and partly in bracket 22, which is secured to the member 21. The construction is shown more fully in Fig. 4 where the arm 19 is seen as if looking from left to right in Fig. 1. Cross head 21 is provided with slots 23 and 24 in the ends thereof and with apertures extending through the forked members formed by the cutting of these slots. Connecting rods 25 and 26 are secured in slots 23 and 24 by means of bolts 27 and 28 passing through the apertures mentioned. The opposite ends of rods 25 and 26 are connected respectively to arms 13 and 14', being provided with forked members for that purpose. Arms 13 and 14' may be provided with a series of apertures in order to afford means for adjustment.

Brake beam 1 consists of two sections similarly formed and carrying collars 30 and 31 on their inner ends, these collars being held in bracket 3 formed in the manner illustrated in Fig. 2. One of the members of this bracket is provided with the usual concave portion 32, and the other member thereof with flanges 33 and 34 arranged to hold within the concave portion of such member the said collars 30 and 31. It will thus be seen that each of the sections of the brake shaft has an independent movement and also that each of the rods 25 and 26 connected with members 13 and 14 respectively may have a movement different from that of the other member whereby each of the brake shoes will be applied to the respective wheels with the necessary force and the proper degree of throw. The cross head 21 connected by means of a ball and socket joint with arm 19 permits of the movement of said cross head in all directions, and such movements of the arms 25 and 26 as are necessary to carry out the purpose of the device.

In the modification shown in Fig. 6 the rods 40 connect the cross-head 41 with the pivoted members 42 and 44 of a so-called whiffletree brake. Member 42 carries a brake shoe 43 at its outer end, and member 44 carries a shoe 45. Cross-head 41 is similar to the cross-head previously described and has a ball and socket connection with an arm 46 of rock shaft 47. A lever 48 connected to one end of shaft 47 provides means for rocking the latter.

My improvement may be applied to brakes of various kinds and I do not wish to restrict myself to its use in connection with vehicle brakes.

What I claim is:—

1. In a brake, a brake shoe operating device comprising a plurality of rocking members, each movable independently of the other, a brake shoe operated by each of said rocking members, an arm carried by each of said rocking members, a cross head, means connecting said arms with said cross head, a rocking power shaft, and a projecting arm connected therewith formed with a ball for engaging said cross head, whereby when said rocking shaft is operated power will be conveyed to said rocking members for applying said brake shoes.

2. In a brake, a divided brake shaft carrying brake shoes at the outer ends thereof, abutting collars connected to the inner ends of each part of said brake shaft, a housing for said collars for permitting a rotary motion thereof but preventing longitudinal motion thereof, an arm extending from each part of said brake shaft, a link pivotally connected with each of said arms, a head formed with a socket pivotally connected with each of said links, a power shaft formed with one end bent at substantially right angles to the general direction of the shaft and formed with a ball for fitting into said socket, and means for rocking said power shaft, whereby power is conveyed independently to each part of said brake shaft for applying an even pressure to said brake shoes.

3. In a brake, a brake shaft comprising a plurality of members each having a movement independent of that of the other, a collar carried by the inner end of each of said members, a device surrounding said collars and holding the abutting ends of the members in rotatable position, a supplemental shaft, and means connected with said shaft and with each of the members of the brake shaft for operating the latter independently.

4. In a brake, a brake shaft comprising a plurality of members each having a movement independent of that of the other, a collar connected with the inner end of each of said members, a bracket surrounding such collars, said bracket being provided with flanges for holding the collars and the inner ends of the members of the brake shaft rotatably in position, a supplemental shaft, means for rocking said supplemental shaft, an arm carried by one end of the supplemental shaft, a cross head connected with said arm by a ball and socket joint, arms carried by the members of the brake shaft, and connecting devices extending from said arms to the ends of the cross head.

5. In a brake, a brake shaft comprising a plurality of members each having a movement independent of that of the other, arms extending at right angles to the members of said shaft near their inner ends, collars formed on the inner end of each of said members, said collars being arranged adjacent to each other, means for holding the inner ends of the shaft members rotatably in position, a supplemental shaft mounted adjacent to the brake shaft and arranged to be rocked, an arm projecting from the inner arm of the supplemental shaft carrying a ball on the upper end thereof, a cross head provided with a socket arranged to receive the ball carried by said arm, and connecting rods secured to the ends of the cross head and arranged to operate the members of the brake shaft.

In testimony whereof I affix my signature in presence of two witnesses.

DAVID W. EVANS.

Witnesses:
 EUGENE SPENCER,
 REESE HAMMONDS.

Copies of this patent may be obtained for five cents each, by addressing the "Commissioner of Patents, Washington, D. C."